Jan. 17, 1950 D. B. GARDINER 2,494,753
POWER TRANSMISSION
Filed Feb. 2, 1946 2 Sheets-Sheet 1

INVENTOR.
DUNCAN B. GARDINER
BY
Ralph L. Tweedale
ATTORNEY

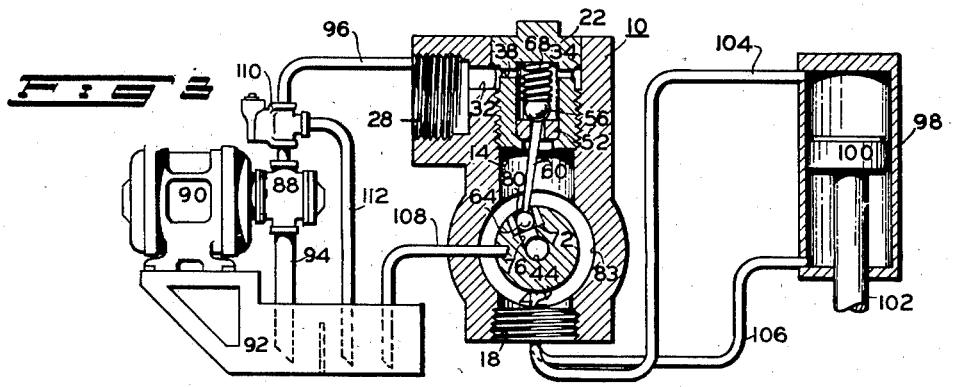
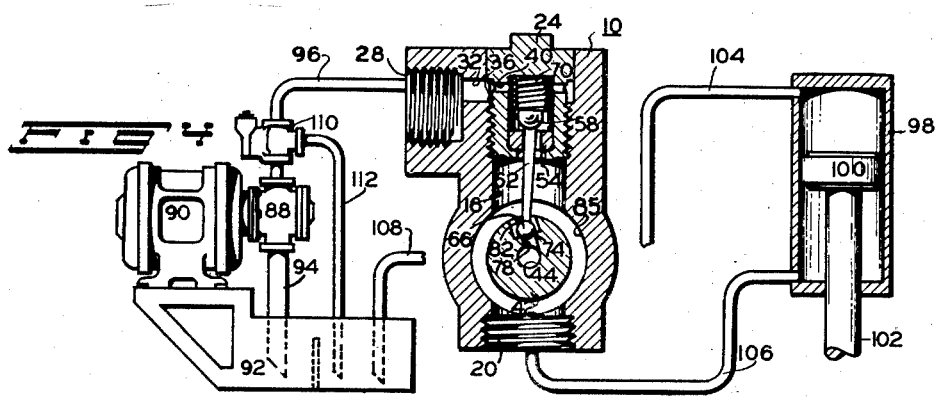
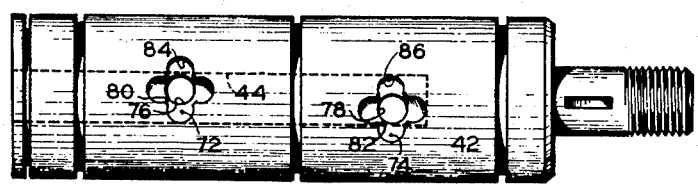

Patented Jan. 17, 1950

2,494,753

UNITED STATES PATENT OFFICE 2,494,753

POWER TRANSMISSION

Duncan B. Gardiner, Detroit, Mich., assignor to Vickers Incorporated, Detroit, Mich., a corporation of Michigan Application February 2, 1946, Serial No. 645,078

8 Claims. (Cl. 277—20)

This invention relates to power transmissions, particularly to those of the type comprising two or more fluid pressure energy translating devices, one of which may function as a pump and another as a fluid motor.

This invention is particularly concerned with that class of valves for controlling the directional flow of fluid in a hydraulic system.

In this class of valves the poppet type has become widely used, particularly for use in aircraft hydraulic systems where compactness and light weight are important matters of consideration. One type of directional control valve utilizes a poppet valve connected to a push rod stem which is adapted to open and close a cooperative seat member by means of a cam carried by a rotatable shaft.

It is an object of this invention to provide an improved poppet type, directional control valve which utilizes a stem connected at each end of which is a poppet valve but which entirely eliminates the use of cams by substituting the simple and novel expedient of a rotatable seat carried by a rotary shaft which in its preferred form may be constructed as a part of the shaft.

It is also an object of this invention to provide a device of this general class comprising a housing containing porting and passages the flow of fluid through which is controlled by poppet valves connected at each end of a rod which is inserted through a stationary seat, one of said valves being resiliently suspended and biased upon said seat while the other valve is adapted to unseat from a rotatable seat member carried by a control shaft as the shaft is rotated in one direction or to seat thereon forcing the other valve off of its seat as the shaft is rotated in the opposite direction.

It is also an object of this invention to provide a dependable and practical directional control valve which will have a long life, is of simple design and is inexpensive to manufacture.

Further objects and advantages of the present invention will be apparent from the following description, reference being had to the accompanying drawings wherein a preferred form of the present invention is clearly shown.

In the drawings:

Figures 3 and 4 are identical diagrammatic views of a hydraulic circuit incorporating the device of Figure 1, and showing the device in two different sectional views.

Figure 5 is a plan view of a portion of the device shown in the afore-mentioned figures.

Figure 1:
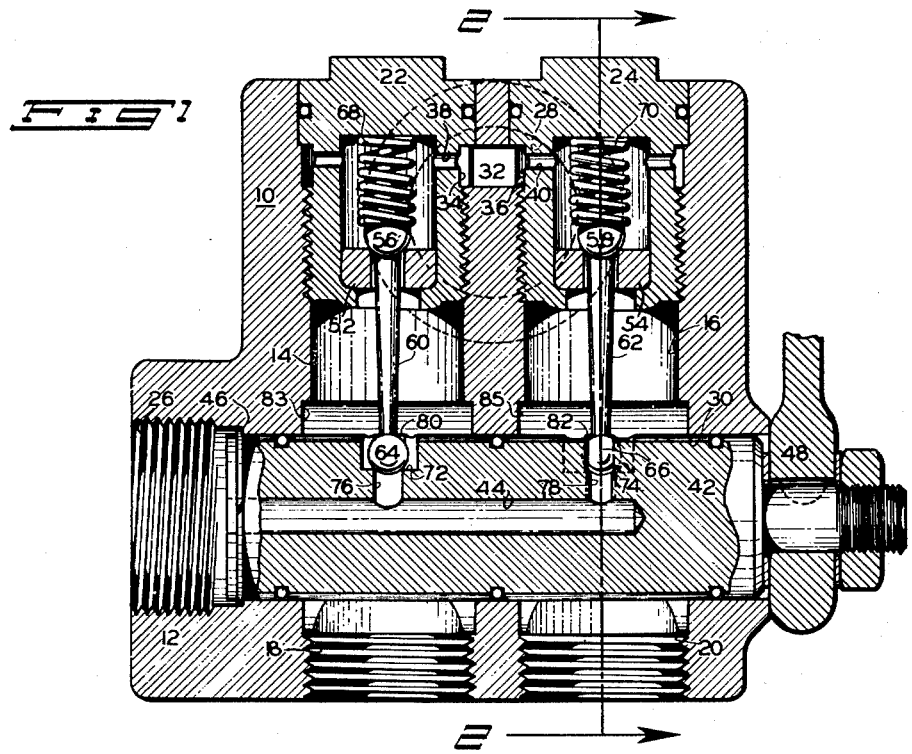
Figure 1 is a cross-sectional view of a preferred form of the present invention.
Figure 2:
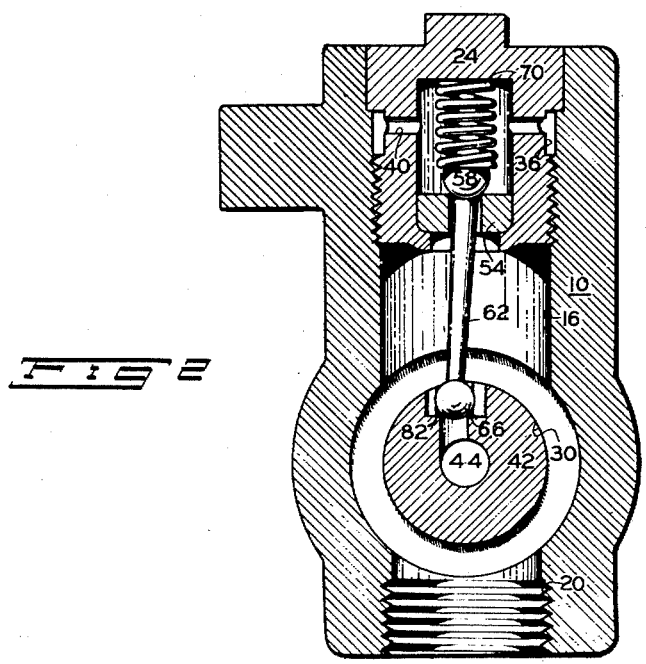
Figure 2 is a sectional view taken from line 2—2 of Figure 1.

Referring now to Figure 1 there is shown a directional control valve 10 comprising a housing 12 provided with a pair of adjacently located vertical bores 14 and 16 extending completely through the housing 12 at one end of which are formed motor ports 18 and 20, the opposite end of said bores being closed by hollow plugs 22 and 24. The housing 12 is also provided with a tank port 26 and a pressure port 28, the tank port 26 being formed at the left end of a longitudinal bore 30 extending completely across the housing 12 and which intersects the vertical bores 14 and 16. The pressure port 28 is connected to the vertical bores 14 and 16 by means of a passage 32 which intersects duplicate grooves 34 and 36 connected to duplicate passages 38 and 40, respectively, formed in plugs 22 and 24.

A control shaft 42 having a longitudinal bore 44 in alignment with and in direct communication with the tank port 26, is rotatably mounted in bore 30 by means of a snap ring 46, said shaft having a portion extending from the right end of bore 30 for connection thereto of an operating lever 48.

Duplicate seat members 52 and 54 are swaged within plugs 22 and 24 upon which are resiliently seated ball valves 56 and 58 which are connected to rods 60 and 62, respectively, extending through said seats at the other end of which are connected small ball valves 64 and 66. Duplicate springs 68 and 70 mounted within plugs 22 and 24, tend to bias valves 56 and 58, respectively, upon seat members 52 and 54. Duplicate seats 72 and 74 are provided for valves 64 and 66 by means of transverse parallel bores 76 and 78 formed in shaft 42. Counterbores 80 and 82, respectively, thereof having a diameter approximately equal to the diameter of valves 64 and 66 act as guides for said valves. Bores 76 and 78 intersect longitudinal bore 44 of shaft 42 so that the valves 64 and 66, in cooperation therewith, control the flow of fluid from motor ports 18 and 20 to tank port 26.

The angular location of the seats 72 and 74 on the shaft 42 is such that if the shaft 42 is rotated in one direction, the seat 72 will move away from valve 64, valve 56 remaining seated, while seat 74 will move toward valve 66 to seat the same, and upon further rotation will shift valve 58 to unseat the same. If the shaft 42 is rotated in the opposite direction, seat 74 will move away from valve 66, valve 58 remaining seated, and seat 72 will contact valve 64 to seat the same and upon further rotation of shaft 42 unseat valve 66.

Referring to Figure 5, due to the fact that the diameter of counterbores 80 and 82 are approximately equal to the diameter of valves 64 and 66 so as to provide a guiding action therefor, counterbores 80 and 82 have been provided with a plurality of clover leaf slots 84 and 86, respectively, thereof to permit free flow of fluid from bores 14 and 16 through seats 72 and 74 to passage 44 of shaft 42 when valves 64 and 66 are unseated. In order to permit flow from pressure port 28 to motor ports 18 and 20 past the shaft 42 in bores 14 and 16, longitudinal bore 30, in which said shaft is mounted and which intersects said bores, is provided with duplicate grooves 83 and 85.

Referring to Figures 3 and 4, there is shown a hydraulic circuit containing a pump 88 driven by an electric motor 90 which may withdraw fluid from a tank 92 by means of a conduit 94 and deliver said fluid to the pressure port 28 of valve 10 by means of a delivery conduit 96. The motor port 18 of valve 10 (shown in Figure 3) is connected to the head end of a fluid motor 98 containing a piston 100 to which is connected a piston rod 102 by means of a conduit 104, and the motor port 20 of valve 10 (shown in Figure 4) is connected to the rod end of said motor by means of a conduit 106. The tank port 26 is connected to tank 92 by means of a conduit 108.

A relief valve 110 of suitable construction is incorporated in the pump delivery conduit 96 for the purpose of exhausting excessive pressure fluid to tank 92 by means of a conduit 112. The Figures 3 and 4 illustrate one position of the valves 56 and 64 connected to rod 60 and of the valves 58 and 66 connected to rod 62 during operation of valve 10.

Referring now to Figures 3 and 4 with the pump 88 in operation, pressure fluid is delivered by said pump by means of conduit 96 to the pressure port 28 of valve 10.

With shaft 42 rotated to the position shown, valve 56 remains seated by means of spring 68 and is also biased upon the seat by pressure fluid entering the interior of plug 22 by means of groove 34 and passage 38, the effective area of the exposed portion thereof tending to seat the valve. Due to the fact that seat 72 has been rotated away from valve 64, communication is open between motor port 18 and tank port 26.

As shown in Figure 4, seat 74 has contacted valve 66 and shifted said valve so as to unseat valve 58, because of its connection to rod 62, and opening communication between pressure port 28 and motor port 20. Pressure fluid entering pressure port 28 flows through passage 32 and is admitted to plug 24 by means of groove 36 and passage 40, from where it flows past valve 58 through seat 54 into bore 16 and by means of groove 85 around shaft 42 to motor port 20. From motor port 20 pressure fluid is conducted to the rod end of motor 98 by means of conduit 106 to shift piston 100.

Discharging fluid from the head end of motor 98 is conducted to the motor port 18 of valve 10 by conduit 104 and enters bore 14 from which the flow is blocked by valve 56 but is free to flow to tank 92 by means of groove 83, clover leaf slots 84, bore 76, longitudinal bore 44 in shaft 42, tank port 26 and conduit 108.

If shaft 42 is rotated in the opposite direction, seat 74 will shift in contact with valve 66 and valve 58 will shift and be biased upon seat member 54 by reason of spring 70 and also by pressure fluid. Further rotation of shaft 42 will result in seat 74 moving away from valve 66. Seat 72 at the same time would contact valve 64 and the continued rotation of shaft 42 would shift the latter valve, because of rod 60, to unseat valve 56. The pressure port 28 would now be in communication with motor port 18 by reason of groove 34 and passage 38 of plug 22, seat member 52, bore 14 and groove 83 so that pressure fluid could be delivered to the head end of motor 98 by means of conduit 104. Discharging fluid from the rod end of motor 98 would be free to flow to tank 92 by means of conduit 106, motor port 20, bore 16, groove 85, clover leaf slots 86, bore 78, longitudinal bore 44 in shaft 42, tank port 26 and conduit 108.

It should be noted that although the invention has been shown and described in its preferred form as a four-way directional valve that its construction is easily and readily adaptable for use as a three-way directional valve.

It should also be noted that the novel use of double poppet valves and interconnected stem in conjunction with a stationary seat and a rotatable seat carried by a rotatable shaft, results in a reduction in number of control element members and a housing therefor which is greatly simplified. The number of bores in the housing is greatly reduced by utilizing the extreme ends of the poppet valve mounting bores as motor ports and one end of the rotary shaft mounting bore as a tank port.

While the form of embodiment of the invention as herein disclosed constitutes a preferred form, it is to be understood that other forms might be adopted, all coming within the scope of the claims which follow.

What is claimed is as follows:

1. A directional control valve comprising in combination a first passage having an inlet and an outlet, a first valve seat stationarily mounted in said passage, a first valve for controlling the flow of fluid through said seat, means biasing said valve on said seat to normally close communication between the inlet and the outlet of the passage, a second passage having an inlet and an outlet, said inlet being connected to the first passage between the valve seat and the outlet thereof, a second valve seat rotatably mounted in the second passage, a second valve for controlling the flow of fluid through the second seat, means connecting the first valve to the second valve, and means for rotating the second seat in one direction away from the second valve whereby the outlet of the first passage is opened to the outlet of the second passage and for rotating the second seat in another direction to contact and shift the second valve whereby the first valve is unseated to open communication between the inlet and the outlet of the first passage.

2. A directional control valve comprising in combination a first passage having an inlet and an outlet, a first valve seat stationarily mounted in said passage, a first valve for controlling the flow of fluid through said seat, means biasing said valve on said seat to normally close communication between the inlet and the outlet of the passage, a second passage having an inlet and an outlet, said inlet being connected to the first passage between the valve seat and the outlet thereof, a second valve seat rotatably mounted in the second passage, a second valve for controlling the flow of fluid through the second seat, means connecting the first valve to the second valve, and means for rotating the second seat in one direction away from the second valve whereby the outlet of the first passage is opened to the outlet of the second passage, said first valve remaining seated to close communication between the inlet and outlet of the first passage, and for rotating the second seat in another direction to contact and shift the second valve whereby the first valve is unseated to open communication between the inlet and the outlet of the first passage, said second valve closing communication between the inlet and the outlet of the second passage.

3. A directional control valve comprising in combination a housing having externally located ports including a first, a second and a third port, a first passage connected to the first and second ports, a first valve seat stationarily mounted in said passage, a second passage connected to the first passage between the valve seat and the second port, a second valve seat rotatably mounted in the second passage, a first valve for controlling the flow of fluid through the first valve seat, a second valve for controlling the flow of fluid through the second valve seat, means normally biasing the first valve on the first valve seat, means connecting the first valve to the second valve, and means for rotating the second valve seat away from the second valve and towards said valve to contact and shift the same, whereby when the second valve seat is rotated in one direction the second port is in communication with the third port and the first port is blocked from communication with the second port, and when the second valve seat is rotated in another direction the first valve is unseated to open communication between the first port and the second port while the second valve closes communication between the third port and the second port.

4. A directional control valve comprising in combination a housing having externally located ports including a first, a second and a third port, a first passage connected to the first and second ports, a first valve seat stationarily mounted in said passage, a second passage connected to the first passage between the valve seat and the second port, a second valve seat rotatably mounted in the second passage, a first valve for controlling the flow of fluid through the first valve seat, a second valve for controlling the flow of fluid through the second valve seat, means normally biasing the first valve on the first valve seat, means connecting the first valve to the second valve, and means for rotating the second valve seat away from the second valve and towards said valve to contact and shift the same, whereby when the second valve seat is rotated in one direction the second port is in communication with the third port and the first port is blocked from communication with the second port and the third port, and when the second valve seat is rotated in another direction the first valve is unseated to open communication between the first port and the second port while the second valve closes communication between the third port and the second port, and the third port and first port.

5. A directional control valve comprising in combination a housing having externally located ports including a first, a second and a third port, a first passage connecting the first port to the second port, a first valve seat stationarily mounted in said passage, means forming a bore in said housing intersecting said passage and connected to the third port, a shaft rotatably mounted in said bore, a longitudinal passage in said shaft connected to the third port, a transverse bore formed in said shaft connected to the shaft passage, said bore forming a second valve seat on said shaft located within the first passage, a first valve for controlling the flow of fluid through the first valve seat, a second valve for controlling the flow of fluid through the second valve seat, a rod connecting the first valve to the second valve shiftable through the first valve seat, means normally biasing the first valve upon the first valve seat, and means for rotating the shaft in opposite directions whereby when the shaft is rotated in one direction the second valve seat rotates away from the second valve to open communication between the second port and the third port and when rotated in the opposite direction the second valve seat rotates towards the second valve to contact the same and close communication between the third port and the second port and upon further rotation thereof said seat shifts said valve to unseat the first valve and open communication between the first port and the second port.

6. A directional control valve comprising in combination a housing having externally located ports including a first, a second and a third port, a first passage connecting the first port to the second port, a first valve seat stationarily mounted in said passage, means forming a bore in said housing intersecting said passage between the first valve seat and the second port, and connected to the third port, a shaft rotatably mounted in said bore, a longitudinal passage in said shaft connected to the third port, a transverse bore formed in said shaft connected to the shaft passage, said bore forming a second valve seat on said shaft located within the first passage, a first valve for controlling the flow of fluid through the first valve seat, a second valve for controlling the flow of fluid through the second valve seat, a rod connecting the first valve to the second valve shiftable through the first valve seat, means normally biasing the first valve upon the first valve seat, and means for rotating the shaft in opposite directions whereby when the shaft is rotated in one direction the second valve seat rotates away from the second valve to open communication between the second port and the third port while the first valve remains seated to close communication between the first and second ports, and when rotated in the opposite direction the second valve seat rotates towards the second valve to contact the same and close communication between the third port and the second port and upon further rotation thereof said seat shifts said valve to unseat the first valve and open communication between the first port and the second port.

7. A directional control valve including a first stationary valve seat member, a second rotatable valve seat member, a unitary valve member for controlling the flow of fluid through said seats comprising a stem, and a first valve and a second valve connected at opposite ends of said stem, said first valve being normally biased upon said stationary seat with the stem being inserted through said seat, and means for rotating the second valve seat in one direction away from the second valve for unseating the second valve and in another direction towards the second valve for seating and shifting the second valve.

8. A directional control valve including a first stationary valve seat member, a second rotatable valve seat member, a unitary valve member for controlling the flow of fluid through said seats comprising a stem, and a first valve and a second valve connected at opposite ends of said stem, said first valve being normally biased upon said stationary seat with the stem being inserted through said seat, and means for rotating the second valve seat in one direction away from the second valve for unseating the second valve, said first valve remaining seated on the first valve seat, and in another direction towards the second valve for seating and shifting the second valve, said first valve being shifted herewith to unseat from the first valve seat.

DUNCAN B. GARDINER.

REFERENCES CITED

The following references are of record in the file of this patent:

UNITED STATES PATENTS

| Number | Name | Date |
|---|---|---|
| 2,279,693 | Martin | Apr. 14, 1942 |
| 2,366,693 | Benaway | Jan. 9, 1945 |
| 2,416,091 | Fitch | Feb. 18, 1947 |

FOREIGN PATENTS

| Number | Country | Date |
|---|---|---|
| 445,559 | Great Britain | Apr. 14, 1936 |